United States Patent
Pederson et al.

(10) Patent No.: US 8,621,968 B1
(45) Date of Patent: Jan. 7, 2014

(54) TIRE SHEARING APPARATUS

(71) Applicants: Les Pederson, Dakota Dunes, SD (US); Joe Brehmer, Lyons, NE (US)

(72) Inventors: Les Pederson, Dakota Dunes, SD (US); Joe Brehmer, Lyons, NE (US)

(73) Assignee: Eagle International, Inc., Dakota Dunes, SD (US)

( * ) Notice: Subject to any disclaimer, the term of this patent is extended or adjusted under 35 U.S.C. 154(b) by 0 days.

(21) Appl. No.: 13/679,043

(22) Filed: Nov. 16, 2012

(51) Int. Cl.
*B26D 7/02* (2006.01)
*B26D 1/02* (2006.01)

(52) U.S. Cl.
USPC ............... 83/410.9; 83/460; 83/499; 83/527

(58) Field of Classification Search
USPC ........ 83/951, 410.8, 499, 495, 409, 516, 527, 83/508, 202, 203, 704, 719, 730, 411.7, 83/410.7, 410.9
See application file for complete search history.

(56) References Cited

U.S. PATENT DOCUMENTS

| | | | | |
|---|---|---|---|---|
| 1,663,462 A | * | 3/1928 | MacDonald | 12/52 |
| 1,943,113 A | * | 1/1934 | Daum | 83/620 |
| 2,010,576 A | * | 8/1935 | Whyte | 30/268 |
| 2,242,091 A | * | 5/1941 | Schilke | 26/11.4 |
| 2,297,177 A | * | 9/1942 | Tiffany | 83/620 |
| 2,668,351 A | * | 2/1954 | Andis et al. | 30/210 |
| 3,389,626 A | * | 6/1968 | Wise | 83/868 |
| 3,808,931 A | * | 5/1974 | Vulcano | 83/409 |
| 3,911,772 A | * | 10/1975 | Kisielewski | 83/278 |
| 3,922,942 A | * | 12/1975 | Fawcett et al. | 83/620 |
| 3,958,482 A | * | 5/1976 | Claesson | 83/559 |
| 3,979,984 A | * | 9/1976 | Daniels | 83/410 |
| 4,291,462 A | * | 9/1981 | Corder | 30/221 |
| 4,338,840 A | * | 7/1982 | Farrell et al. | 83/622 |
| 4,355,556 A | * | 10/1982 | Ulsky | 83/124 |
| 4,377,958 A | * | 3/1983 | Leighton | 83/410.7 |
| 4,738,172 A | * | 4/1988 | Barclay | 83/18 |
| 5,121,663 A | * | 6/1992 | Tahara et al. | 83/42 |
| 5,267,496 A | * | 12/1993 | Roach et al. | 83/133 |
| 5,370,027 A | * | 12/1994 | Mathian | 83/527 |
| 5,440,813 A | * | 8/1995 | Roskam | 30/254 |
| 5,531,146 A | | 7/1996 | Pederson | |
| 5,551,325 A | * | 9/1996 | Schutt | 83/133 |
| 5,555,782 A | * | 9/1996 | Pagaza-Melero et al. | 82/46 |
| 5,692,305 A | * | 12/1997 | Roskam | 30/254 |
| 5,765,727 A | * | 6/1998 | Masley | 225/3 |
| 5,783,035 A | | 7/1998 | Pederson | |
| 5,813,305 A | * | 9/1998 | Miazga et al. | 83/508 |
| 5,868,328 A | * | 2/1999 | Luoma | 241/101.2 |
| 5,943,930 A | * | 8/1999 | Fasske | 83/456 |
| 6,131,637 A | * | 10/2000 | Pederson | 157/1.17 |

(Continued)

*Primary Examiner* — Sean Michalski
(74) *Attorney, Agent, or Firm* — Jeffrey A. Proehl; Woods, Fuller, Shultz & Smith, P.C.

(57) ABSTRACT

A shearing apparatus may comprise a frame and a shearing assembly configured to shear a portion of a tire along a shear plane, the shearing assembly including a lower shear blade structure and an upper shear blade structure mounted on the frame. The apparatus may also comprise a tire indexing structure configured to advance a portion of the tire a distance through the shear plane for shearing the portion of the tire from a remainder of the tire. The tire indexing structure may include a tire clamping assembly to clamp onto the tire and movable between an initial and a final position to move the tire through the shear plane, a carriage assembly to move the tire clamping assembly between the initial and final positions, and a guide defining a path along which the carriage and tire clamping assemblies are movable between the positions.

18 Claims, 14 Drawing Sheets

(56) References Cited

U.S. PATENT DOCUMENTS

| | | | |
|---|---|---|---|
| 6,240,819 B1* | 6/2001 | Su et al. | 83/176 |
| 7,975,579 B1* | 7/2011 | Pederson | 82/1.11 |
| 8,225,701 B2* | 7/2012 | Vainer et al. | 83/54 |
| 2002/0035908 A1* | 3/2002 | Kawashima et al. | 83/368 |
| 2003/0024369 A1* | 2/2003 | Dunn et al. | 83/733 |
| 2003/0106402 A1* | 6/2003 | Solon | 83/19 |
| 2012/0255410 A1* | 10/2012 | Kido et al. | 83/202 |
| 2012/0297944 A1* | 11/2012 | Maddaleni et al. | 83/23 |

\* cited by examiner

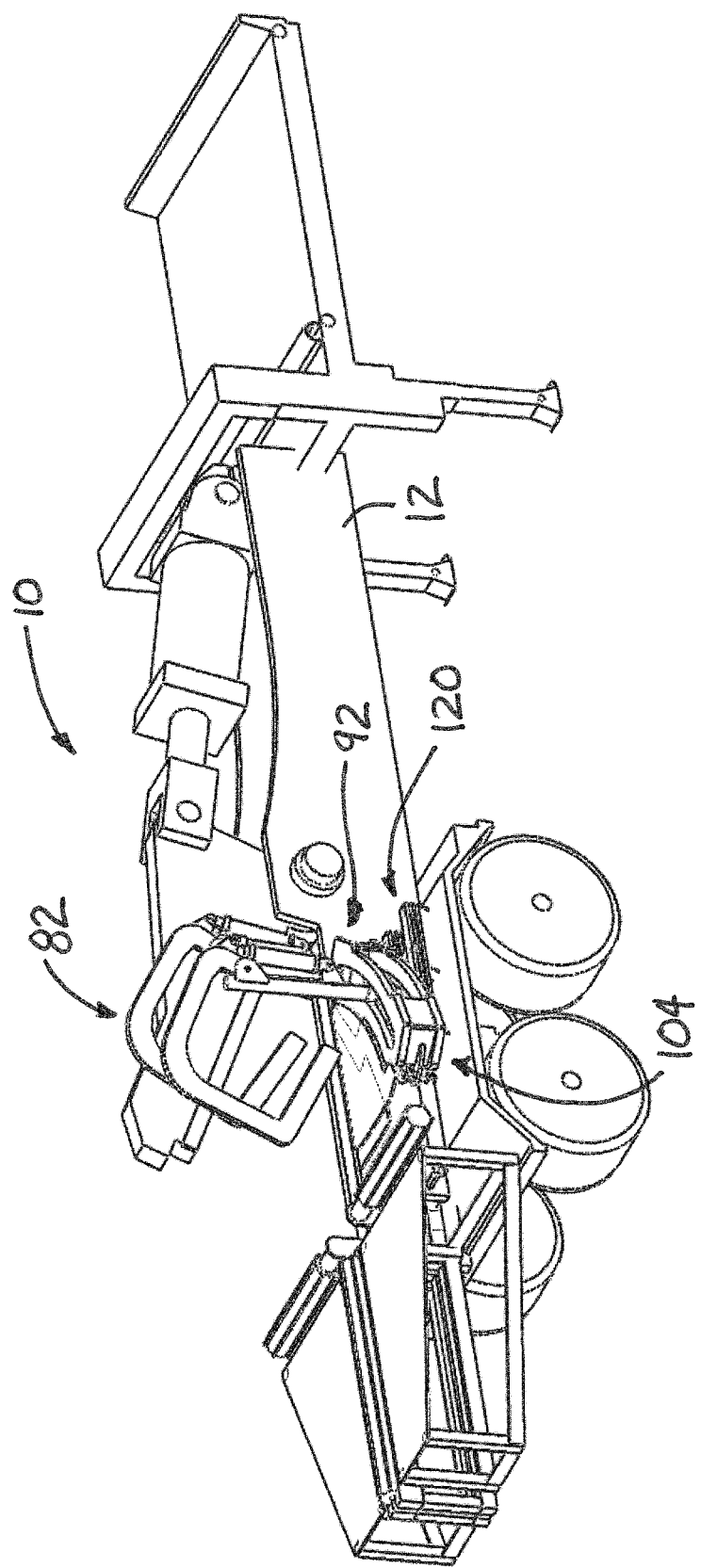

TIRE SHEARING APPARATUS

BACKGROUND

1. Field

The present disclosure relates to apparatus for cutting objects and more particularly pertains to a new tire shearing apparatus for facilitating faster and more uniform shearing of a tire into pieces that may be more easily transported and processed.

2. Description of the Prior Art

Specialized machinery has been developed for shearing used tires into forms that are more suitable for transport and recycling of the tires. Illustrative technology is illustrated in U.S. Pat. No. 5,531,146; U.S. Pat. No. 5,783,035; U.S. Pat. No. 6,131,637; and U.S. Pat. No. 7,975,579, which are hereby incorporated by reference in their entireties.

The size of a tire that can be transported and/or processed may be limited, so the portion of the circumference of the tire that may be suitably included in one piece of sheared tire will vary depending upon the size of the tire and will vary greatly due to the large range in tire sizes that may be processed by the machinery. Moreover, the larger the tire, the more cuts that will have to be made in repetitive cutting operations that must maintain consistency in size so that the maximum weight is not exceeded. It may be difficult to maintain any consistency in the size of the ire segments when the operation needs to be repeated many times, even if the cycle times are relatively short. Moreover, as the length of the segment of tire will vary from one tire to the next depending upon the size of the tire, it may be difficult for an operator to remember the correct distance that the tire is to be advanced through the shear to achieve the correct length of the tire segment.

SUMMARY

In one aspect, the present disclosure relates to a shearing apparatus for cutting tires, and which may comprise a frame and a shearing assembly configured to shear a portion of a tire along a shear plane, with the shearing assembly including a lower shear blade structure and an upper shear blade structure mounted on the frame in a shearing relationship with the lower shear blade structure. The apparatus may also comprise a tire indexing structure configured to advance a portion of the tire a distance through the shear plane for shearing the portion of the tire at the shear plane away from a remainder of the tire. The tire indexing structure may include a tire clamping assembly configured to clamp onto a location on the tire and being movable between an initial position and a final position to move the portion of the tire through the shear plane, a carriage assembly configured to move the tire clamping assembly between the initial position and the final position, and a guide defining a path along which the carriage assembly and tire clamping assembly is movable between the initial and final positions.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 14 is a schematic perspective view of the tire shearing apparatus.

DETAILED DESCRIPTION

Figure 1:
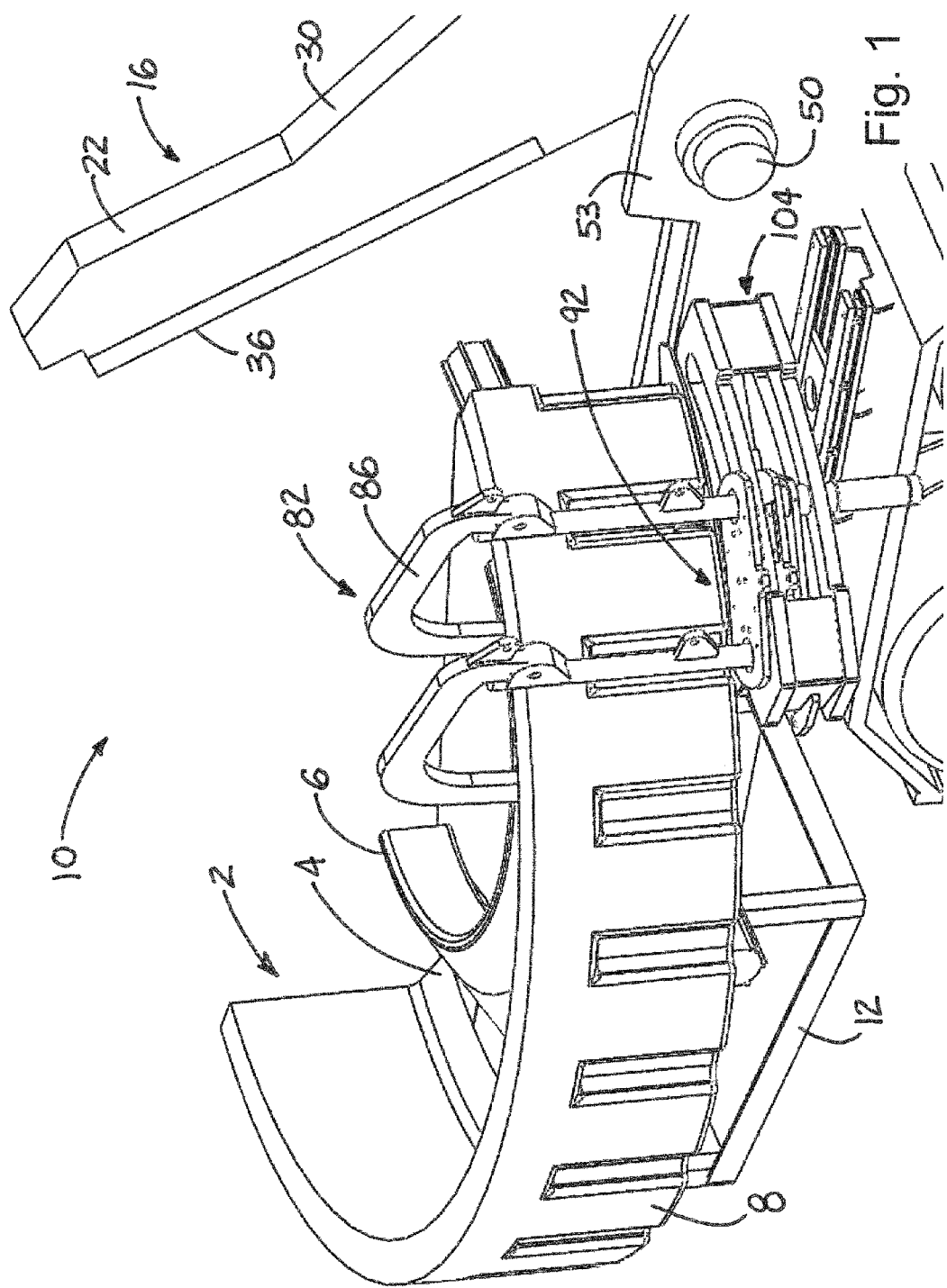
FIG. 1 is a schematic perspective view of a new tire shearing apparatus according to the present disclosure with a portion of a tire supported thereon, and showing the tire being held in an initial position and the shearing assembly in the open position.

With reference now to the drawings, and in particular to FIGS. 1 through 14 thereof, a new tire shearing apparatus embodying the principles and concepts of the disclosed subject matter will be described.

In one aspect, the disclosure relates to a tire shearing apparatus 10 that is highly suitable for cutting or severing tires into pieces that are more easily transported and processed for purposes such as recycling. A tire 2 may include a pair of annular side walls which each include a tire bead 6 that defines the opening of the tire. The side walls extend from the tire bead to a circumferential tread wall 8.

The tire shearing apparatus 10 may include a frame 12 that provides support for various structures and elements of the apparatus 10, and in some embodiments may be provided with wheels 14 to facilitate the movement of the apparatus 10 from location to location, although this is not critical to the functionality of the apparatus. The frame 12 generally extends below the other structures and assemblies of the apparatus 10 to support these elements with respect to each other.

The shearing apparatus 10 may include a shearing assembly 16 that is configured to shear a portion of a tire along a shear plane 18 when the tire is positioned in the assembly 16, and typically will cut the tire along a substantially radial line across the side and tread walls on one side of the tire, so that segments of the tire are cut from the rest of the tire like pie pieces. The shear plane 18 may be a substantially vertically-oriented plane. The shearing assembly 16 may include a lower shear blade structure 20 and an upper shear blade structure 22 that are mounted on the frame 12 in a shearing relationship with each other. The lower 20 and upper 22 shear blade structures may be movable with respect to each other between an open position (see FIGS. 1 and 2) and a shear position (see FIG. 3). In some of the most preferred embodiments, the upper and lower shear blade structures form a V-shaped opening in the open position for receiving a portion of a tire to be cut, and movement of the upper and lower shear blade structures from the open to the shear position is a pivotal movement.

The lower shear blade structure 20 may be is fixedly mounted on the frame such that the lower shear blade structure is immobile when the upper and lower shear blade structures move between the open and shear positions. The lower shear blade structure 20 may include a lower shear blade 24 with a shear edge 26 in a substantially horizontal orientation. The shear edge 26 is generally oriented at the plane on which the tire to be cut is supported on the frame 12, and may be just above or just below that plane although it is preferable that the edge is substantially in the support plane of the tire to facilitate movement of the tire into the opening formed by the upper and lower shear blade structures and to facilitate the shearing of the tire.

The lower shear blade structure may also include one or more guide elements 28 mounted on the frame adjacent to the lower shear blade and may be configured to be positioned adjacent to a portion of the upper shear blade structure when the upper shear blade structure pivots with respect to the lower shear blade structure toward the shear position. The one or more guide elements extend upwardly from the tire support plane so that the one or more guide elements are able to engage at least one of the beads of the tire being severed and thereby function to hold the tire in position in the V-shaped opening as the upper shear blade structure moves downwardly toward the shear position which tends to push the tire from the opening if not blocked by the elements.

Significantly, the one or more guide elements 28 may be elongated in a vertical direction which provides the elements with the ability to engage not only the tire bead closest to the tire support plane, but also the other tire bead if it remains on the tire carcass. Illustratively, the vertical height of the one or more elements 28 above the tire support plane may be increased to be in the range of approximately 18 inches to 22 inches which is highly suitable for engaging both beads of a tire. This elongation of the one or more guide elements 28, 29 can avoid the tendency of the upper tire bead and side wall to creep or move over the top end of the elements as the upper shear blade structure makes contact with the tire and pushes against it to create the shearing action.

The upper shear blade structure 22 may be moveably mounted on the frame to move with respect to the fixed lower shear blade structure. The upper shear blade structure 22 may include an upper blade support arm 30 that is pivotably mounted on and movable with respect to the frame. The upper shear blade support arm 30 may have an inboard end 32 and an outboard end 34. The inboard end 32 may be pivotally mounted on the frame 12 and the outboard end 34 may swing in an arc when the upper blade support arm is pivoted between the open and shear positions.

The upper shear blade structure 22 may further include an upper shear blade 36 that is mounted on the upper shear blade support arm 30 and may extend for substantially the entire length of the arm. The upper shear blade 36 may be positioned adjacent to the lower shear blade 24 when the upper and lower shear blade structures are in the shear position, and may be spaced from the lower shear blade when the upper and lower shear blade structures are in the open position. The upper shear blade may also have a shear edge that may contact as the shear blade structures move from the open to the shear position. The upper 36 and lower 24 shear blades may have respective shear surfaces 37, 25 that extend from the respective shear edges of the respective blades. The shear surfaces are in contact with each other in the shear position of the upper and lower shear structures, and a plane of the shear surface 37 of the upper shear blade 36 is preferably parallel to a plane of the shear surface 25 of the lower shear blade 26 such that the shear surfaces are in abutment when the upper and lower shear structures are in the shear position. Gaps between the shear surfaces of the blades caused by shear surfaces that lie in diverging planes that have previously been used tend to allow portions of the tire to move in between the shear surfaces and tend to impede or impair the movement of the blade structures.

The upper shear blade structure may further include an upper grip element 40 that is configured to grip a tire positioned between the upper and lower shear blade structures when the upper shear blade structure moves toward the lower shear blade structure to achieve the shear position. The smooth and linear nature of the blades 24, 36 tend to permit the tire to slide along the shear edges and surfaces unless there is some resistance to the movement. The upper grip element 40 having a lower edge 42 that is contoured to grip a tire positioned in the V-shaped opening, and may be mounted on the upper blade support arm 30 adjacent to the upper shear blade, and may even protrude beyond the shear edge of the upper shear blade. The lower edge 42 may have a plurality of arcuate divots 44 and may also have a plurality of flats 45, with a flat being positioned between each of the divots to space the divots from each other. In some of the most preferable embodiments, the arcuate divots 44 are semicircular in shape. The arcuate divots are highly effective for engaging the tire to resist sliding of the tire along the shear edge of the upper shear blade 36 as the blade 36 moves downwardly and apply pressure to the tire.

A pivot mount 48 may be mounted on the frame 12 to support the upper blade support arm 30 in a manner that permits the pivot movement of the arm 30. The pivot mount 48 may include a pivot pin 50 and a pair of pin supports 52, 53 that are mounted on the frame in a spaced relationship with respect to each other with the pivot pin extending between the pin supports. The inboard end 32 of the upper blade support arm may be positioned between the pin supports with the pin 50 passing through the arm and extending at least partially into the supports 52, 53.

The apparatus 10 may also include a thrust adjustment assembly 54 that provides an adjustable degree of thrust correction for the upper shearing blade structure 22 as the blade structure 22 moves from the open position to the shear position to bias the upper shear blade against the lower shear blade even as the tire being sheared tends to force these elements out of alignment and out of contact with each other as the upper shear blade structure pivots downwardly. The thrust adjustment assembly 54 may include a thrust plate 56 that is positioned alongside the path of a portion of the upper shearing blade structure 22 and contacts the blade structure 22 as it descends. The thrust plate 56 may be mounted to a thrust plate support 58 positioned behind the thrust plate 56, Collectively the thrust plate and thrust plate support may form a stop or barrier to resist the tire being sheared from sliding away from the shearing assembly 16 as the upper shear blade structure moves downwardly. In some embodiments, a roller 60 is mounted on the upper shear blade structure 22 that is positioned to contact the face 57 of the thrust plate 56 along a portion of the movement of the blade structure 22 toward the shear position such that movement close to the shear position is guided by contact between the roller and the thrust plate.

Advantageously, the position of the thrust plate, or at least the face 57 of the thrust plate, is adjustable to permit movement of the face 57 relatively closer and farther from the shear edge 26 of the lower shear blade and thereby adjust the path of the upper shear blade 36 to be closer to the lower shear blade 24, such as ear of the parts occurs. In the illustrative embodiments, the position of the thrust plate with respect to the thrust plate support may be adjusted by one of more fasteners that extend into the thrust plate and the thrust plate support and are threaded to adjust the proximity of these elements to each other by rotating the fasteners. Optionally, other elements may be used to adjust the proximity of these elements.

The apparatus 10 may also include a tire support structure 70 that is mounted on the frame 12 and is configured to support a tire in the support plane and at a level that permits the tire to be advanced over the lower shear blade structure 20. The tire support structure 70 may include at least one roller 72 on which a tire may be rested and the tire may be rotated about a substantially horizontal axis to rotate the tire about a substantially vertical axis. The tire support structure may include a plurality of rollers that are arranged to support locations along the circumference of the tire, and may be oriented, for example, at 90 degree intervals. The rollers may be positioned on substantially opposite positions with respect to the shear plane and may also be positioned in the shear plane. The tire support structure 70 may also include a support surface 74 that substantially corresponds to the support plane, and may be located on or both sides of the shear plane.

The tire shearing apparatus 10 may also include a tire indexing structure 80 that is configured to advance a portion of the tire for a distance through the shear plane, with the distance of advancement being substantially uniform at each movement of the tire so that consistency in the size and weight of the tire segments may be achieved. The distance of advancement may be adjustable through adjustment of the tire indexing structure, so that the distance may be adjusted to reflect the size of the tire and the resulting tire segment weight and size may controlled. The tire indexing structure 80 thus moves the tire between the upper and lower shear blade structures so that the shear plane defined by the blades 24, 36 cross the location on the tire where shearing the tire will result in a tire segment of desired size.

The tire indexing structure may include a tire clamping assembly 82 that is configured to clamp onto a portion of the tire for the purpose of holding onto the tire while the tire is being moved, and in some implementations holding onto the tire until after the shearing has been accomplished, but the clamping assembly may release the tire after movement has been achieved but prior to shearing. The clamping assembly engages a location on the tire that is adjacent to but not a part of the portion of the tire that is to be sheared away in the next shearing operation, which allows the clamping assembly to remain engaged with the tire while the shearing operation is occurring to help stabilize the tire carcass against movement during shearing.

Figure 2:
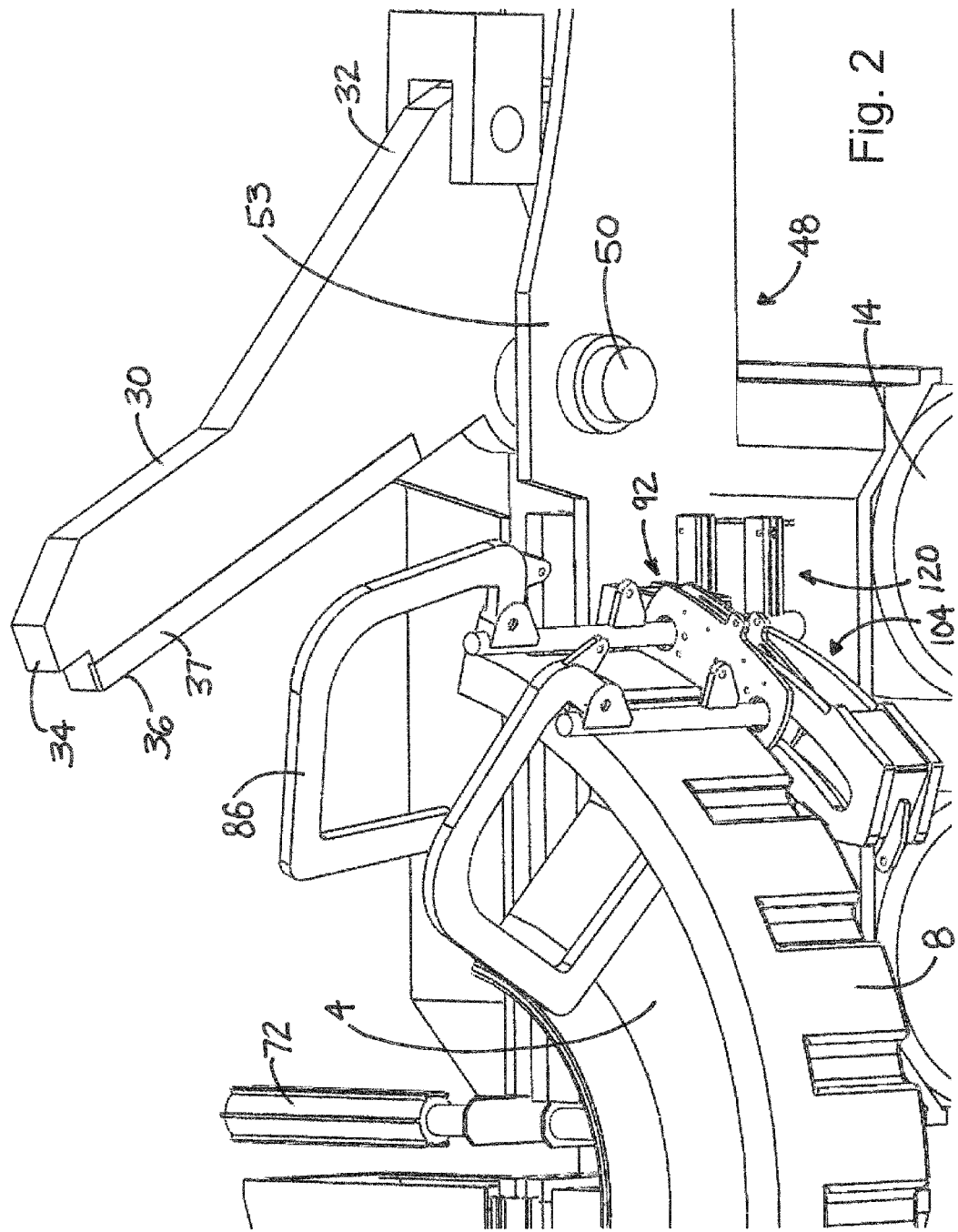
FIG. 2 is a schematic perspective view of the tire shearing apparatus according to the present disclosure showing the tire being held in a final position and the shearing assembly in the open position, with one of the clamps being shown in the clamp position and another one of the clamps being shown in the release position.
Figure 3:
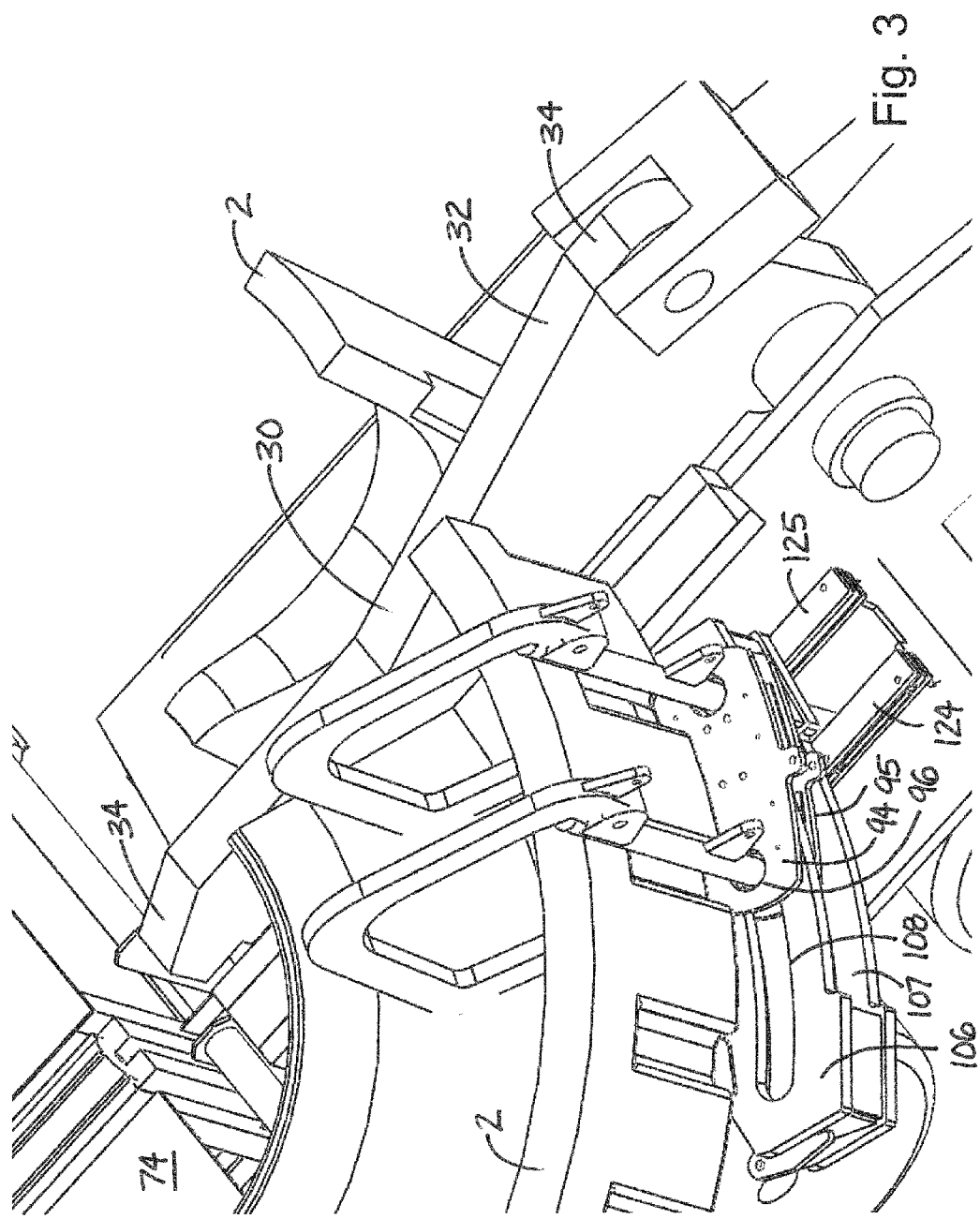
FIG. 3 is a schematic perspective view of the tire shearing apparatus according to the present disclosure showing the tire being held in a final position and the shearing assembly in the shear position, with the clamps shown in the clamp position.
Figure 4:
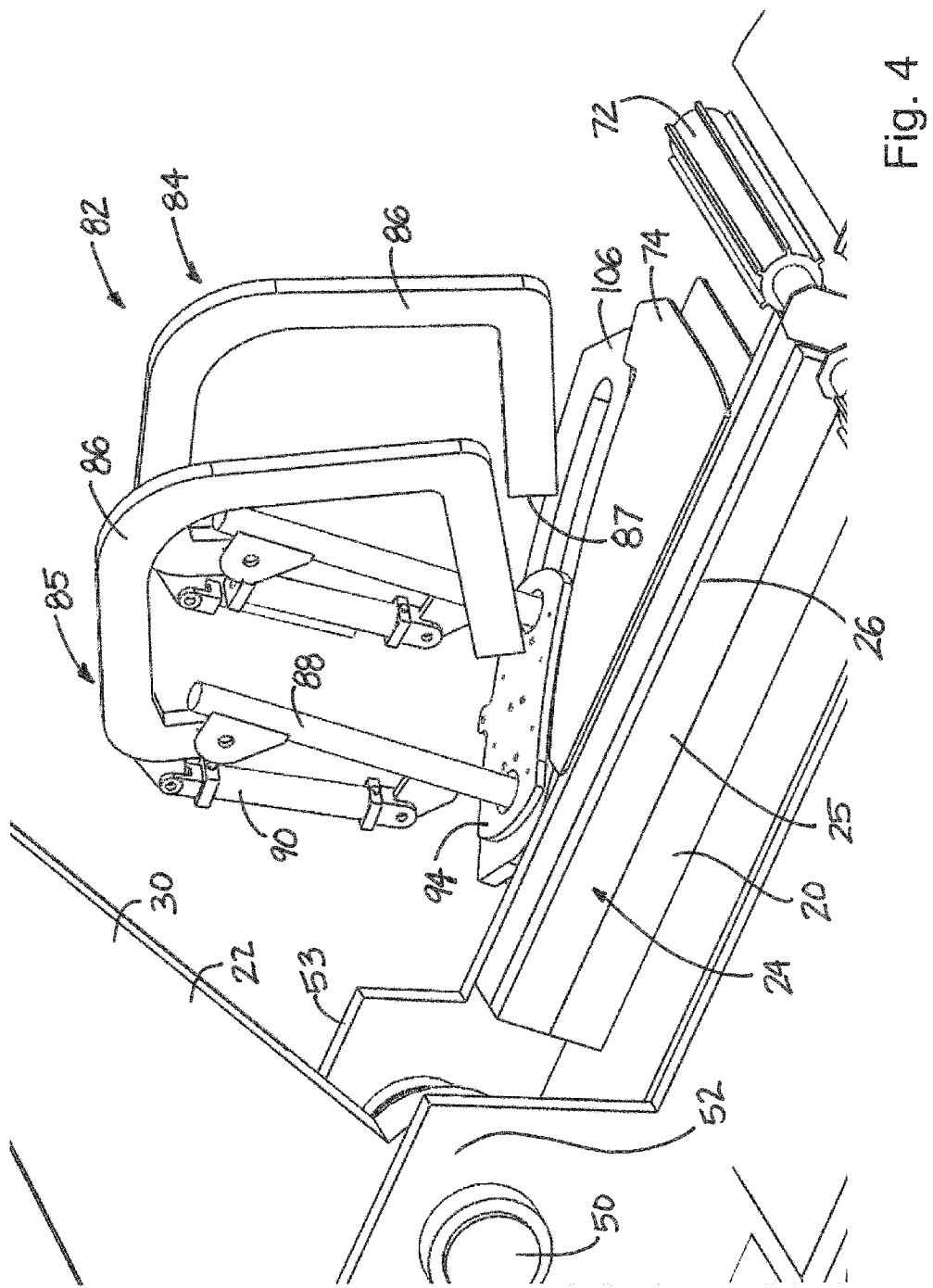
FIG. 4 is a schematic perspective view of the tire clamping assembly according to an illustrative embodiment.
Figure 5:
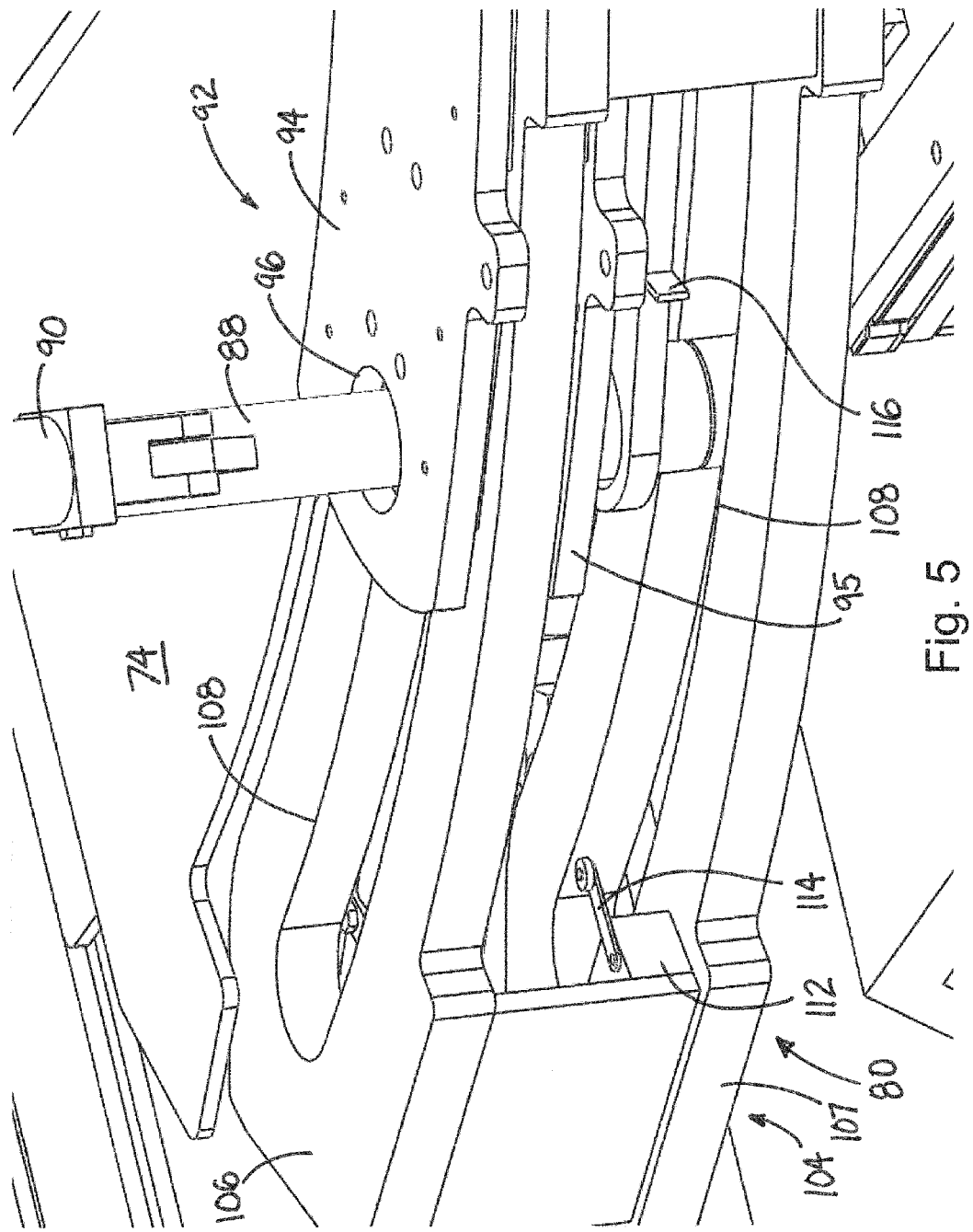
FIG. 5 is a schematic perspective view of a portion of the guide of the tire indexing structure with parts removed to show the elements of the adjustment assembly.
Figure 6:
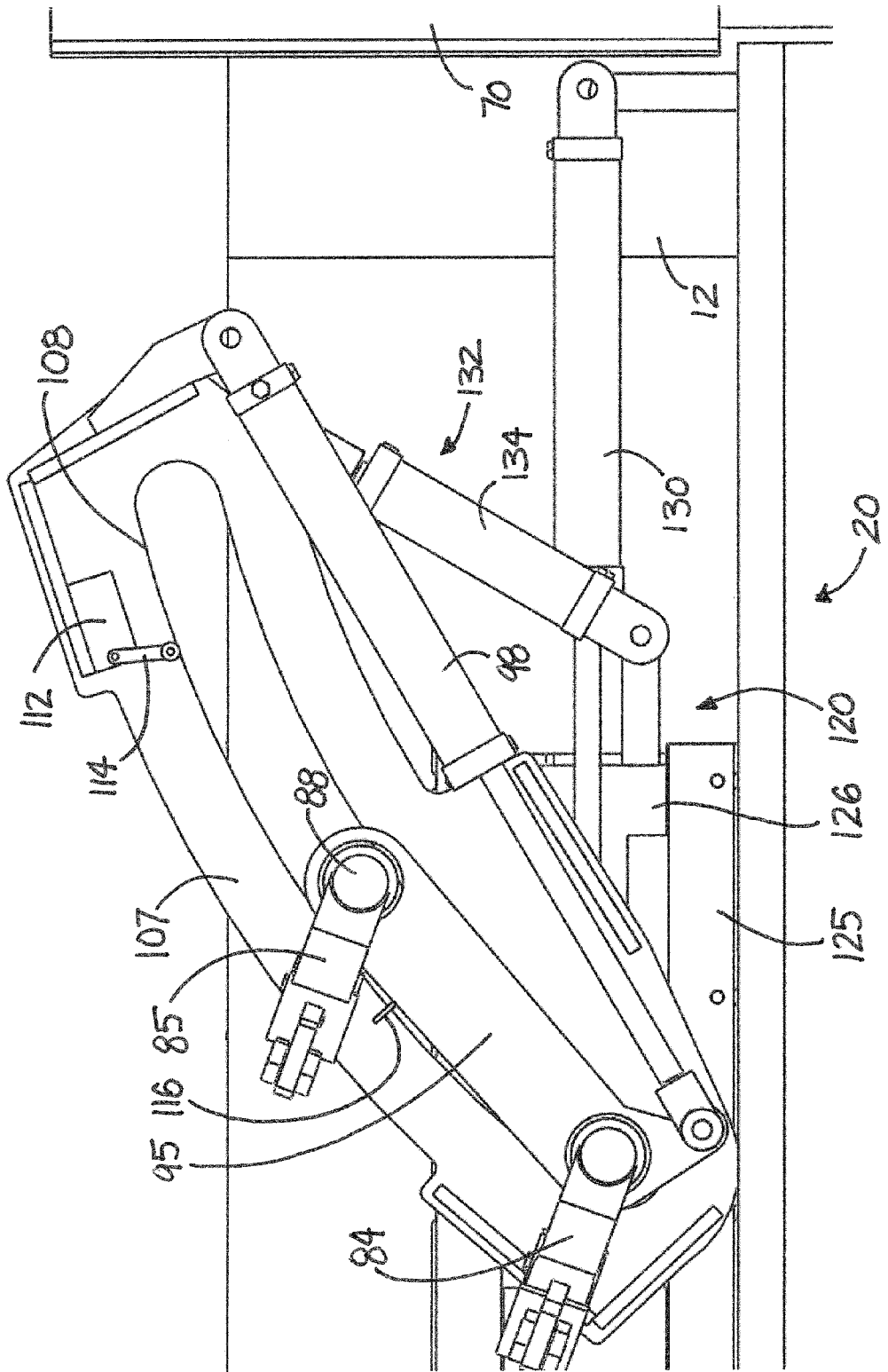
FIG. 6 is a schematic top view of a portion of the tire indexing structure with parts removed to show detail of the various actuators employed in the indexing structure, according to an illustrative embodiment.
Figure 7:
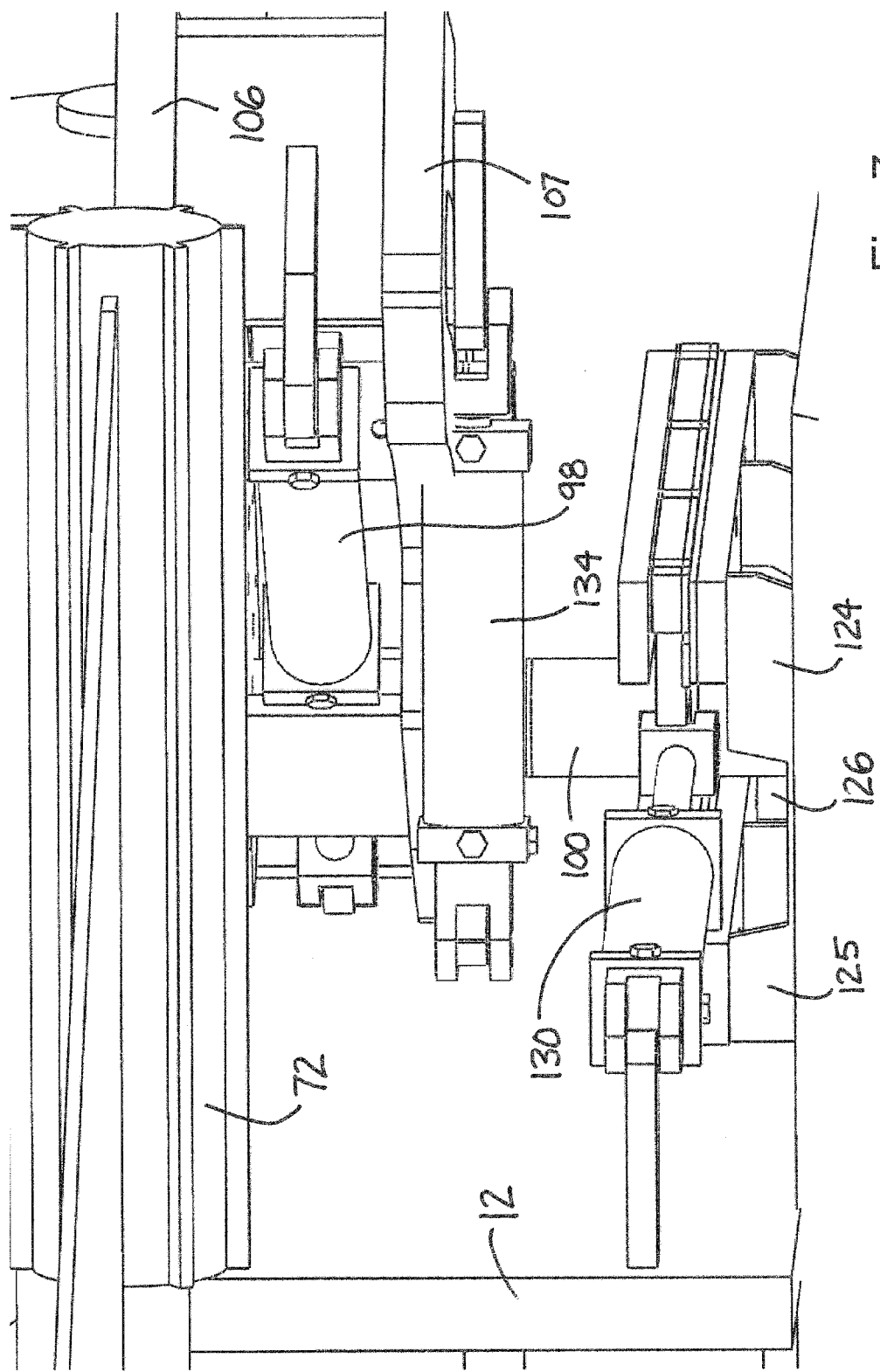
FIG. 7 is a schematic side view of a portion of the tire indexing structure showing various actuators of the indexing structure.
Figure 8:
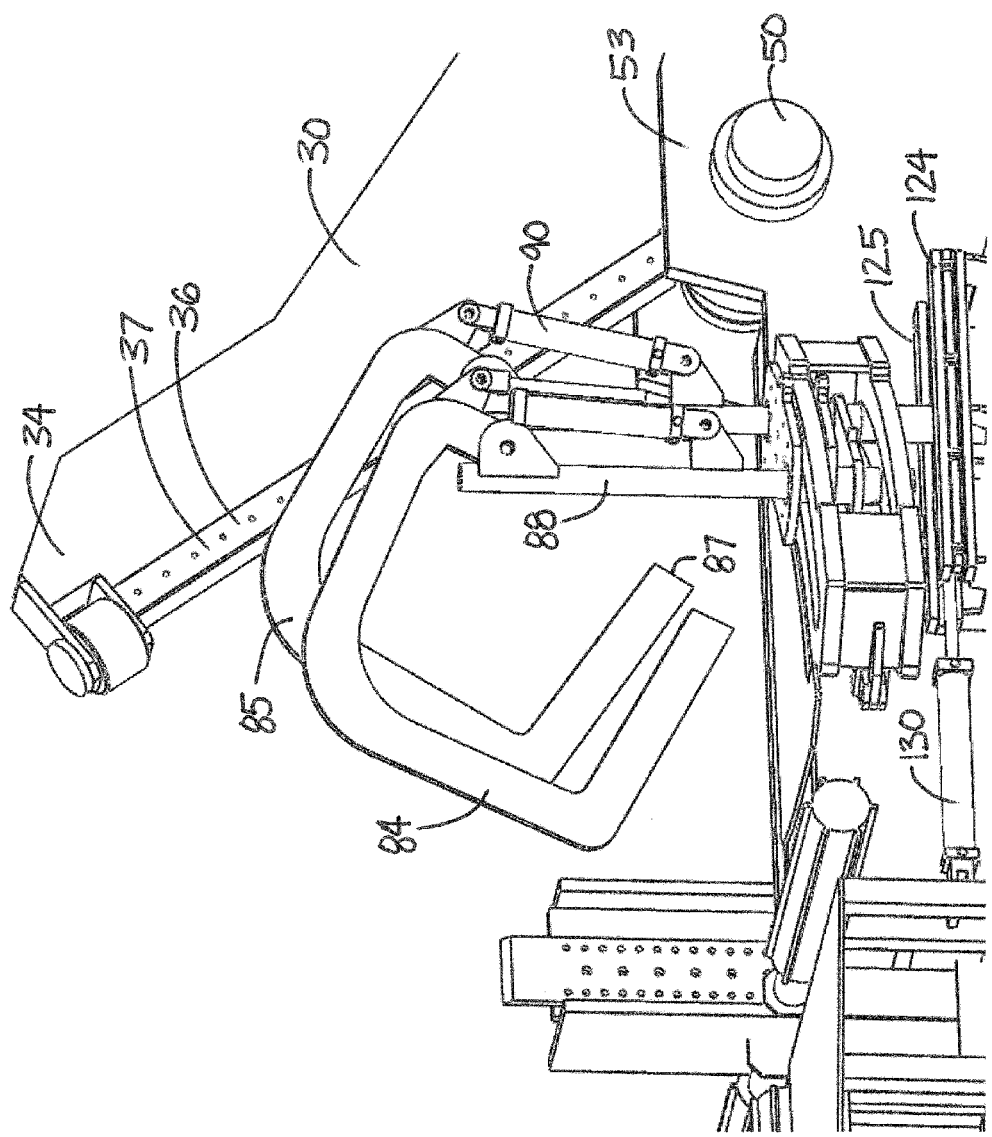
FIG. 8 is a schematic perspective view of a portion of the tire clamping assembly and the trust adjustment assembly, according to an illustrative embodiment.
Figure 9:
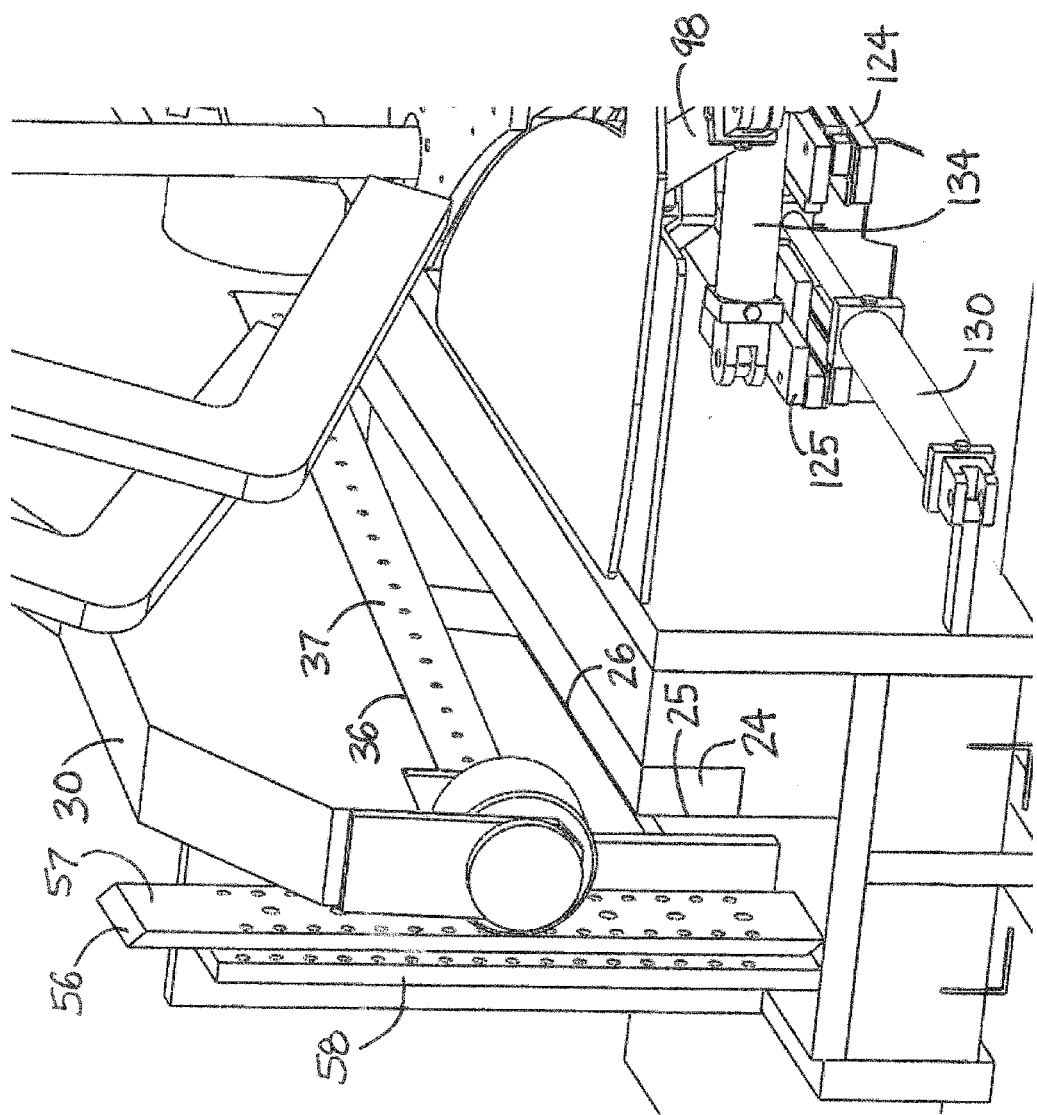
FIG. 9 is a schematic side view of the shearing assembly in a partially open position and showing a roller of the upper shear blade structure contacting the thrust plate of the thrust adjustment assembly, according to an illustrative embodiment.
Figure 10:
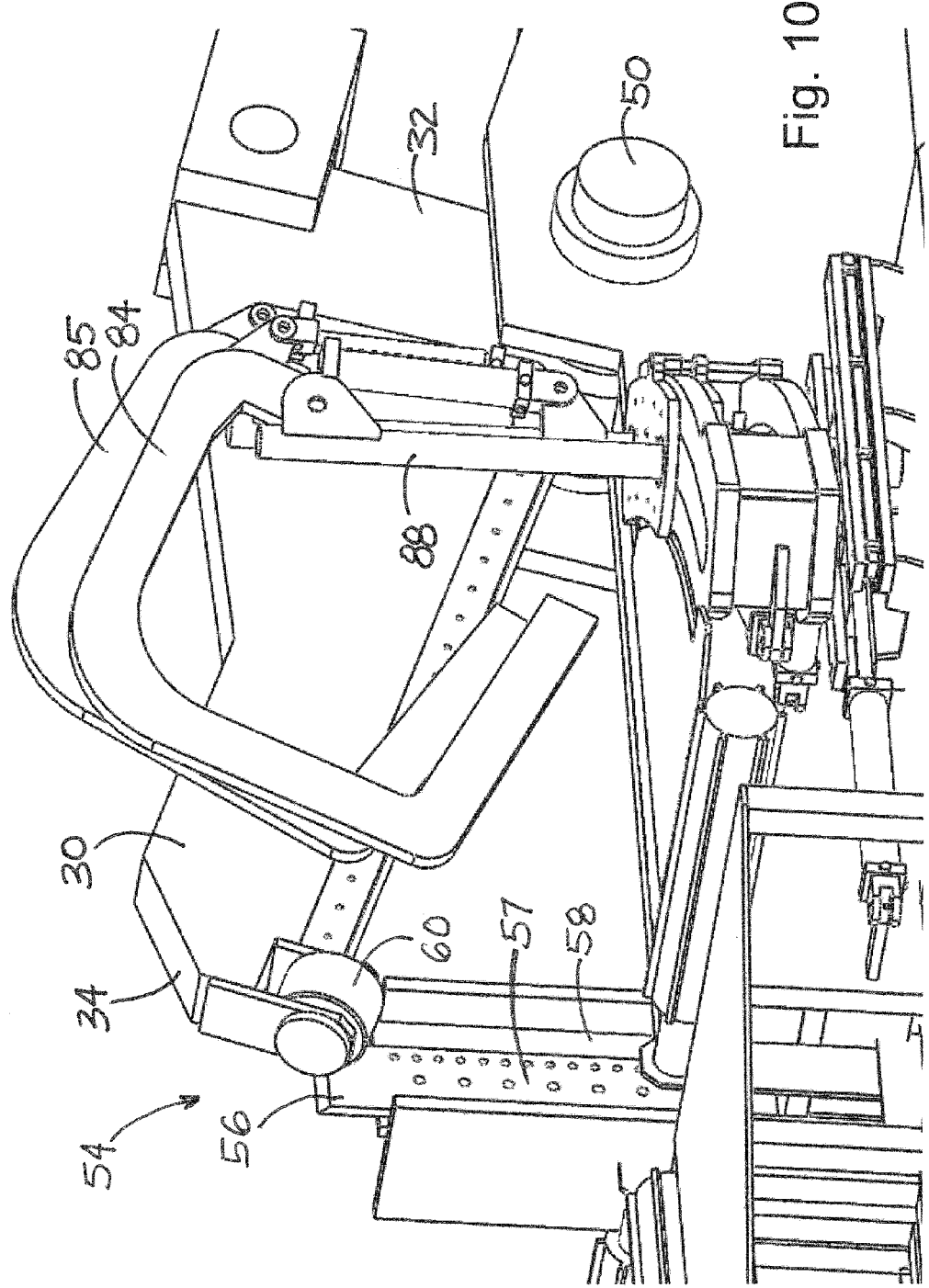
FIG. 10 is a schematic perspective view of the clamping assembly and the shearing assembly with the upper shear blade structure in a position between the open and shear positions.
Figure 11:
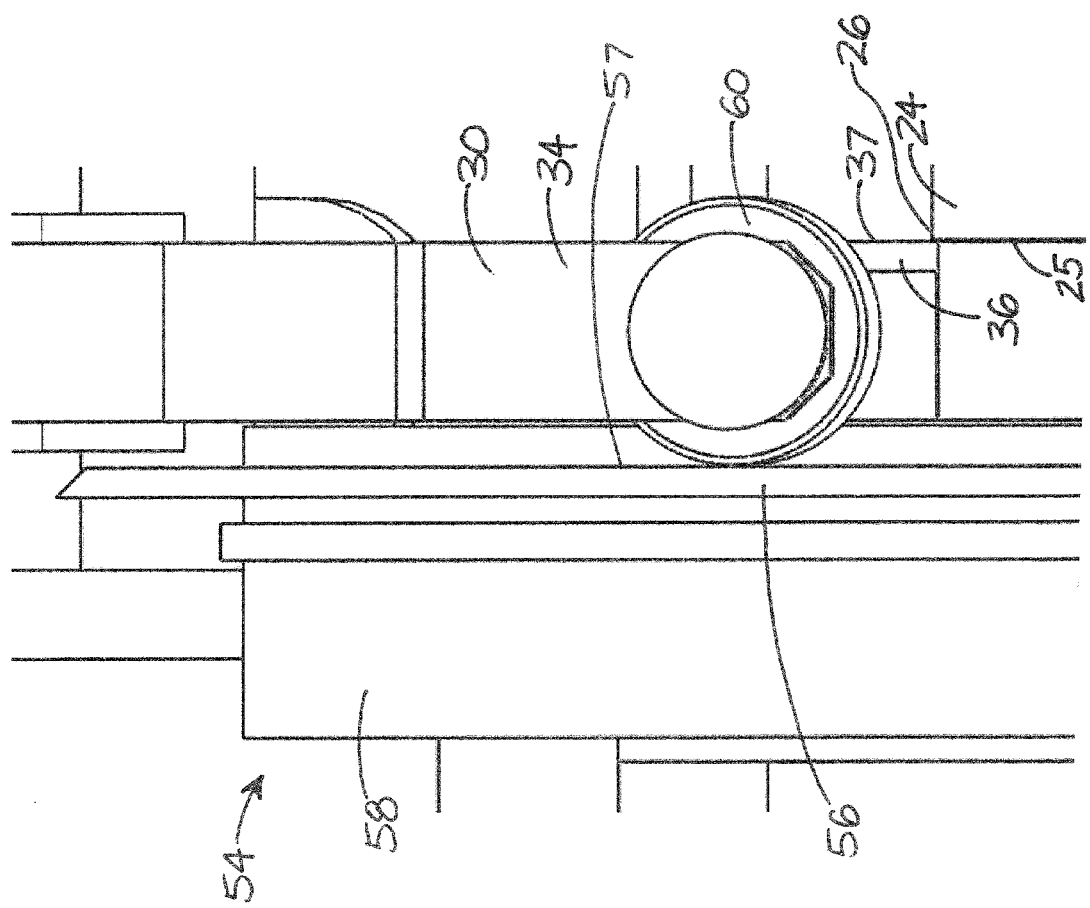
FIG. 11 is a schematic end view of the upper shearing blade structure showing the roller thereof in rolling contact with the face of the thrust plate.
Figure 12:
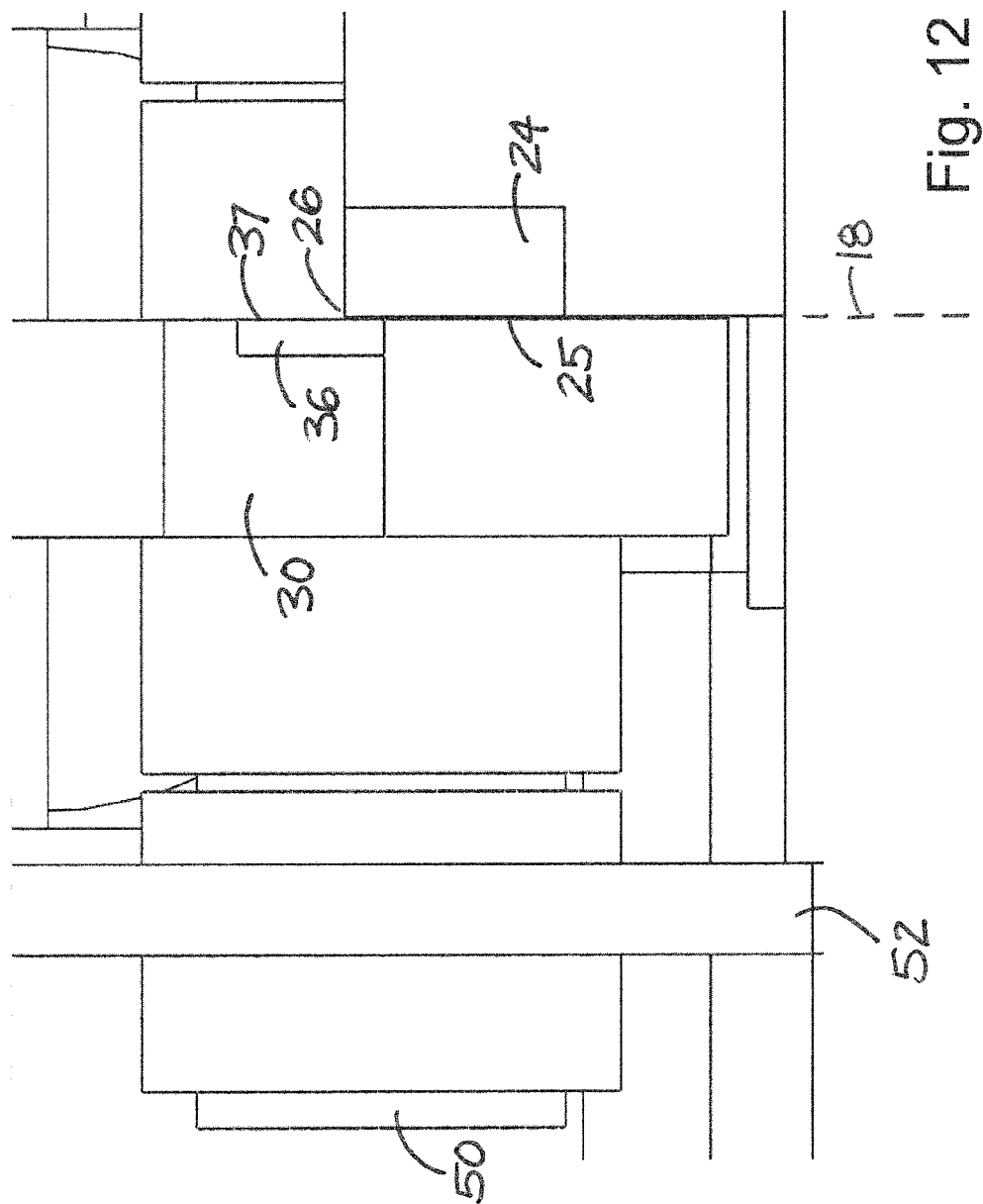
FIG. 12 is a schematic side view of portions of the upper and lower shear blade structures to show a relationship between the upper and lower shear blades.
Figure 13:
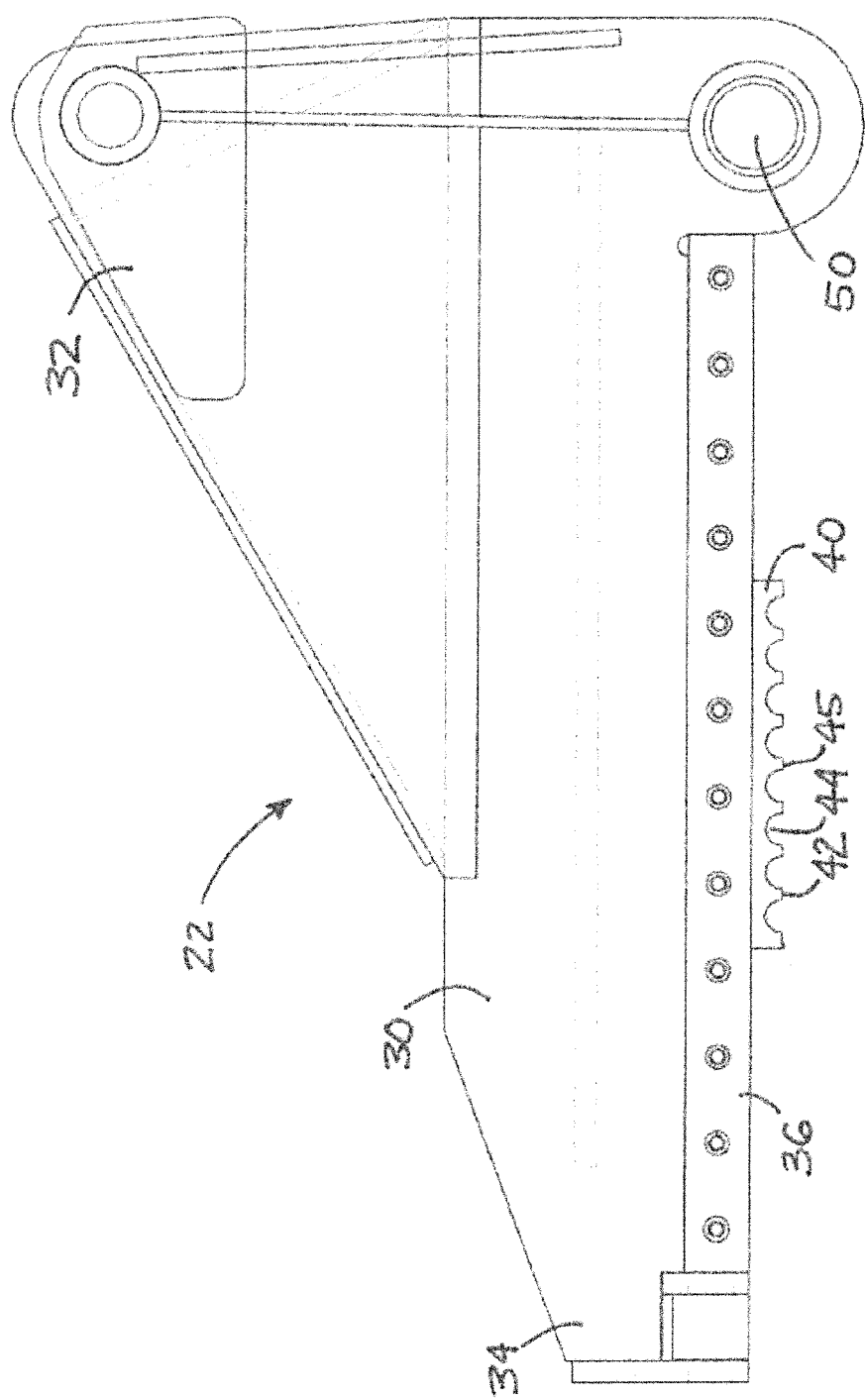
FIG. 13 is a schematic side view of the upper shear blade structure isolated from the remainder of the apparatus to show the upper grip element, according to an illustrative embodiment.

The tire clamping assembly 82 may be movable between an initial position (see FIG. 1) and a final position (see FIGS. 2 and 3). The final position may be located relatively closer to the shear plane than the initial position. The distance between the initial position of the clamping assembly and the final position of the assembly may generally correspond to the distance of advancement of the tire through the shear plane. The distance between the initial and final positions of the assembly 82 may be adjustable to adjust the size or length of the tire segment.

The damping assembly 82 may include at least one clamp 84 that is configured to clamp onto a portion of the wall of the tire, and in some of the most preferred embodiments includes a pair of the clamps 84, 85. Each of the clamps may include a clamp arm 86 that is movable and preferably pivotable between a clamp position (see FIG. 3) which is generally employed when the tire is being advanced through the shear plane and engaged by the arm and a release position (see FIG. 4) which is generally employed when the tire clamping structure is being repositioned with respect to the tire after a shearing operation has been completed, and another portion of the tire needs to be advanced through the shear plane. The clamp position may be characterized by the clamp arms 86 contacting and pressing against a location on the tire, and the release position may be characterized by the clamp being moved out of contact or engagement with the tire. In the illustrative embodiments, the clamp arms 86 are substantially C shaped with a deep depth to allow the arm to reach over the side wall and bead of the tire and reach into the interior of the tire and engage the inner surface 9 of the tread wall with an end or tip 87 of the clamp arm.

Each of the clamps 84, 85 may include an upright member 88, and the clamp arm 86 may be mounted on the upright member, and preferably is pivotally mounted thereon. An end of the clamp arm 86 that is located opposite of the tip 87 may be connected to the upright member, and the tip 87 may be configured so that it presses the portion of the tire that it engages against the upright member 88 (see FIG. 3). Each of the clamps 84, 85 may also include a clamp actuator 90 that is configured to move the clamp arm 86 with respect to the upright member 88, and to accomplish this movement the clamp actuator may be connected to the clamp arm and the upright member.

The tire indexing structure may further include a carriage assembly 92 that may generally support and move the tire clamping assembly 82. The carriage assembly 92 may move the tire clamping assembly from the initial position to the final position as the tire is advanced through the shear plane, and also from the final position to the initial position after the shearing operation when another location on the tire needs to be engaged for the next movement. The clamp or clamps 84, 85 may be mounted on the carriage assembly, and illustratively the upright member 88 extends through the carriage assembly.

The carriage assembly may include at least one carriage plate 94, and may include a pair of carriage plates 94, 95 that may be spaced from each other but oriented generally parallel o each other. A hole 96 may extend through each of the carriage plates 94, 95 and an upright member 88 may extend through the hole. The carriage plate or plates are generally moveable between the initial and final positions of the tire The carriage assembly 92 may include an indexing actuator 98 that is configured to move the carriage plate or plates between a position corresponding to the initial position of the tire clamping assembly and a position corresponding to the final position of the tire clamping assembly.

The tire indexing structure 80 may also include a guide 104 which may define a path along which the carriage assembly 92 and tire clamping assembly 82 may be movable. The path may be generally arcuate in character, although this is not critical. The guide 104 may include at least one guide plate 106, and may include a pair of guide plates 106, 107. The guide plate or plates may be spaced from each other, with one of the carriage plates 95 being located in the space between the guide plates. A slot 108 may extend through the guide plate and may define the path along which the assemblies 82, 92 move. At least one, and preferably both, of the upright members 88 may extend through the slot to facilitate the movement of the assemblies 82, 92 along the path. The slot 108 may have a shape that generally corresponds to the shape of the path. The length of the slot may define the extremes for the initial and final position of the tire clamping assembly.

Another part of the tire indexing structure 80 may be an adjustment assembly 110 that is configured to adjust the distance between the initial position and the final position of the tire clamping assembly. The adjustment assembly may be configured to stop movement of the carriage assembly 92 along the guide 104 when the adjustment assembly is activated. The adjustment assembly may be configured to deactivate the indexing actuator 98 of the carriage assembly when the carriage assembly engages or contacts an element of the adjustment assembly. In some embodiments, the adjustment assembly 110 is configured to permit adjustment of the initial position of the tire clamping assembly while the final position remains relatively unchanged.

The adjustment assembly 110 may include a deactivating switch 112 that is positioned to be contacted and actuated as the carriage assembly and tire clamping assembly move along the path of the guide 104. The switch 112 may include, for example, a switch arm 114 that may be contacted by a stop 116. Illustratively, the switch arm 114 may be mounted on a relatively stationary element of the apparatus 10 and the stop 116 may be mounted on a movable element, although this is not critical and the reverse may be utilized. The position of the switch arm 114 or the stop 116 may be adjustable so as to adjust the point along the path at which the stop engages the deactivating switch, and thus sets the initial position of the tire clamping assembly. Illustratively, the position of the stop 116 may be adjustable, and the stop may be mounted on the carriage assembly 92, such as, for example, on one of the carriage plates. The stop 116 may be slidable along a portion of the carriage plate 95 to set the relative position of the initial position of the tire clamping assembly. In such an illustrative embodiment, the deactivating switch 112 may be mounted on the guide 104, and may be attached to one of the guide plates 106, 107. The deactivating switch may comprise a limit switch that is actuated by physical contact with the switch, although other type of switches that sense proximity may be employed.

The tire indexing structure 80 may further include a tire shifting structure 120 that is configured to shift the tire with respect to the shearing apparatus 18 to adjust for tires of different radius or circumferential sizes. Typically, the tire shifting structure 120 may be adjusted when a tire having a different radius or circumference from the tire previously sheared is placed upon the apparatus 10, and if tires of similar sizes are being sheared, then adjustment may not be desired. The tire shifting structure 120 may be configured to move the position of a tire in the tire clamping assembly 82 along the shear plane to suitably position the tire for optimum effect by the shearing apparatus, such as by locating the tire closer to the guide elements 28, 29. Through the tire shifting structure 120, the upright members 88 of the clamping assembly 82 may be moved closer to and further away from the one or more guide elements 28 to accommodate relatively larger and smaller tire.

Illustratively, the tire shifting structure may include a track 122 on which the guide 104 is movable, and the carriage and tire clamping assembly may be movable on the track with the guide. The track 122 may extend substantially parallel to the shear plane 18 to provide movement of these assemblies and structures in a similar direction. In some embodiments, the track 122 may include a pair of spaced channel elements 124, 125 that are mounted on the frame and along which a slider element 126 is movable. Portions of the guide 104 may be mounted and the slider element 126 to be moved by movement of the slider element along the channel elements 124, 126. The tire shifting structure 120 may also include a shift actuator 130 that is configured to move the slider element 126 along the track, and in turn move portions of the guide in a direction generally parallel to the shear plane 18. Illustratively, extension of the shift actuator 130 may move portions of the guide 104 away from the one or more guide elements 28 and retraction of the actuator 130 may move the guide portions closer to the guide elements.

The tire indexing structure 80 may also include means for shifting the path along with the guide moves to adjust for tire of different radii or circumferences. The tire indexing structure may include a path adjustment structure 132 that rotates at least a portion of the path that the guide moves along. In some embodiments, the adjustment of the path may be accomplished by rotating the guide 104 about a substantially vertical axis, such as an axis that passes through a support post 100 on which portions of the guide 104 are mounted on the slider element 126. Illustratively, the path adjustment structure 132 may include an adjustment actuator 134 that is connected to the slider element 126 of the tire shifting structure 120 and to a location on the guide 103, such as on one of the guide plates 107, such that extension of the actuator 134 rotates the guide 104 about the support post 100 in an outward direction from the shear plane 18, and retraction rotates the guide 104 about the support port in an inward direction toward the shear plane.

In use, the operator may calculate the portion of the circumference of a tire to be sheared from the remainder of the tire, and this calculation may be based upon weight or size restrictions as well as virtually any other factor desired. Based upon the size and type of tire, and the size or weight of the tire portions desired, the operator may utilize software or web-based solutions that determine the portion of the circumference of the tire that may be included in each segment sheared from the remainder. The operator may use this information to adjust the adjustment assembly 110 of the tire indexing structure 80 to a position that is appropriate to provide the desired segment size. Movement of the stop 116 may move the location of the initial position to correspond to the distance that the tire is to be advanced through the shear plane, and correspondingly the size of the tire portion to be removed from the remainder of the tire.

Through the actuation of separate controls, or through an automated control system, the clamps of the tire clamping assembly may be moved to the release position and the tire positioned on the apparatus such that a portion of the tire is ready to be moved through the shear plane. The clamps may be moved from the release position to the clamp position to secure the tire. The carriage assembly may be moved along the path defined by the guide such that the tire clamping assembly moves from the initial position to the final position, thereby moving a portion of the tire to the side of the clamps through the shear plane a distance sufficient so that a suitably sized portion of the tire extends through the shear plane of the shearing assembly. The upper shear blade may be moved from the open position into the shear position, thereby shearing or cutting off the portion of the tire that was moved through the shear plane, and was located on the side of the shear plane opposite of the tire indexing structure. The sheared portion of the tire falls away from the remainder of the tire, and the process may be repeated beginning with the tire clamping moving to the release position prior to the tire clamping assembly moving from the final position to the initial position which was set by the adjustment assembly, so that the operation is easily and quickly repeatable for producing tire pieces of the same size cut after cut, until the adjustment assembly is readjusted to produce tire pieces of a different size.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:
1. A shearing apparatus for cutting tires comprising:
a frame;
a shearing assembly configured to shear a portion of a tire along a shear plane, the shearing assembly including a lower shear blade structure and an upper shear blade structure mounted on the frame in a shearing relationship with the lower shear blade structure;
a thrust adjustment assembly including a thrust plate support mounted in fixed relation to the frame and a thrust plate mounted adjustably on the thrust plate support, wherein the thrust adjustment assembly is configured to press against the upper shear blade structure as the upper shear blade structure moves toward the shear position in an adjustable manner to adjust a proximity of the upper shear blade structure to the lower shear blade structure in the shear position; and
a tire indexing structure configured to advance a portion of the tire a distance through the shear plane for shearing the portion of the tire at the shear plane away from a remainder of the tire, the tire indexing structure including:
a tire clamping assembly configured to clamp onto a location on the tire and being movable between an initial position and a final position to move the portion of the tire through the shear plane;
a carriage assembly configured to move the tire clamping assembly between the initial position and the final position;
and a guide defining a path along which the carriage assembly and tire clamping assembly is movable between the initial and final positions.

2. The apparatus of claim 1 wherein the tire indexing structure includes an adjustment assembly configured to permit adjustment of the distance between the initial position and the final position of the tire clamping assembly to thereby adjust a size of the portion of the tire sheared from the remainder.

3. The apparatus of claim 2 wherein the adjustment assembly is configured to adjust a location of the initial position of the tire clamping assembly.

4. The apparatus of claim 2 wherein the adjustment assembly is configured to stop movement of the carriage assembly along the path of the guide to define a location of the initial position.

5. The apparatus of claim 1 additionally comprising a tire shifting structure configured to shift the path defined by the guide along the shear plane.

6. The apparatus of claim 5 wherein tire shearing structure is configured to move the path in a direction generally parallel to the shear plane.

7. The apparatus of claim 1 wherein the tire clamping assembly includes at least one clamp configured to releasably clamp on a portion of a tread wall of the tire.

8. The apparatus of claim 1 additionally comprising a path adjustment structure configured to adjust an orientation of the path defined by the guide with respect to the shear plane.

9. The apparatus of claim 8 wherein the path adjustment structure is configured to move the path toward and away from the shear plane.

10. The apparatus of claim 1 wherein the path is generally arcuate in shape.

11. A shearing apparatus for cutting tires comprising:
a frame;
a shearing assembly configured to shear a portion of a tire along a shear plane, the shearing assembly including a lower shear blade structure and an upper shear blade structure mounted on the frame in a shearing relationship with the lower shear blade structure, the upper shearing blade structure being movable with respect to the lower shearing blade structure between an open position and a shear position;
wherein the lower shear blade structure includes a lower shear blade with a lower shear blade surface, and the upper shear blade structure includes an upper shear blade with art upper shear blade surface, and a plane of the upper shear blade surface is parallel to a plane of the lower shear blade surface such that the shear surfaces are in abutment when the upper and lower shear structures are in the shear position; and
a thrust adjustment assembly including a thrust plate support mounted in fixed relation to the frame and a thrust plate mounted adjustably on the thrust plate support, wherein the thrust adjustment assembly is configured to press against the upper shear blade structure as the upper shear blade structure moves toward the shear position in an adjustable manner to adjust a proximity of the upper shear blade structure to the lower shear blade structure in the shear position.

12. A shearing apparatus for cutting tires comprising:
a frame;
a shearing assembly configured to shear a portion of a tire along a shear plane, the shearing assembly including a lower shear blade structure and an upper shear blade structure mounted on the frame in a shearing relationship with the lower shear blade structure, the upper shearing blade structure being movable with respect to the lower shearing blade structure between an open position and a shear position;
wherein the lower shear blade structure includes a lower shear blade with a lower shear blade edge, and the upper shear blade structure includes an upper shear blade with an upper shear blade edge; and
wherein the upper shear blade structure includes an upper grip element configured to grip a tire positioned between the upper and lower shear blade structures wherein the upper shear blade structure moves toward the lower shear blade structure, the upper grip element having a lower edge contoured to grip a tire positioned between the upper and lower shear blade structures, the upper grip element being mounted on the upper blade support arm adjacent to the upper shear blade, the lower edge having a plurality of arcuate divots formed therein; and
a thrust adjustment assembly including a thrust plate support mounted in fixed relation to the frame and a thrust plate mounted adjustably on the thrust plate support, wherein the thrust adjustment assembly is configured to press against the upper shear blade structure as the upper shear blade structure moves toward the shear position in an adjustable manner to adjust a proximity of the upper shear blade structure to the lower shear blade structure in the shear position.

13. The apparatus of claim 12 wherein the upper grip element includes a plurality of flats being positioned between the divots to space the divots from each other.

14. The apparatus of claim 12 wherein the arcuate divots are semicircular in shape.

15. A shearing apparatus for cutting tires comprising:
a frame;
a shearing assembly configured to shear a portion of a tire along a shear plane, the shearing assembly including a lower shear blade structure and an upper shear blade structure mounted on the frame in a shearing relationship with the lower shear blade structure, the upper shearing blade structure being movable with respect to the lower shearing blade structure between an open position and a shear position; and
a thrust adjustment assembly including a thrust plate support mounted in fixed relation to the frame and a thrust plate mounted adjustably on the thrust plate support, wherein the thrust adjustment assembly is configured to press against the upper shear blade structure as the upper shear blade structure moves toward the shear position in an adjustable manner to adjust a proximity of the upper shear blade structure to the lower shear blade structure in the shear position.

16. The apparatus of claim 15 wherein the thrust adjustment assembly thrust plate is positioned adjacent to the upper shear blade structure when the upper shear blade structure is in the shear position such that the upper shear blade structure contacts the thrust plate in the shear position.

17. The apparatus of claim 16 wherein a position of the thrust plate is adjustable such that the position of contact with the upper shear blade structure is adjustable.

18. The apparatus of claim 16 wherein the thrust adjustment assembly includes a roller mounted on the upper shear blade structure such that the roller contacts a face of the thrust plate as the upper shear blade structure moves toward the shear position.

* * * * *